US006993839B2

(12) United States Patent
Sturtevant et al.

(10) Patent No.: US 6,993,839 B2
(45) Date of Patent: Feb. 7, 2006

(54) METHOD FOR MACHINING A STAINLESS STEEL EXHAUST MANIFOLD FOR A MULTI-CYLINDER COMBUSTION ENGINE

(75) Inventors: Jeffrey L. Sturtevant, Hamilton, OH (US); Timothy W. Chapman, Cincinnati, OH (US)

(73) Assignee: Omni Integrated Technologies, Inc., Fairfield, OH (US)

( * ) Notice: Subject to any disclaimer, the term of this patent is extended or adjusted under 35 U.S.C. 154(b) by 399 days.

(21) Appl. No.: 10/195,291

(22) Filed: Jul. 15, 2002

(65) Prior Publication Data

US 2004/0006871 A1 Jan. 15, 2004

(51) Int. Cl.
*B23P 17/00* (2006.01)
*B23P 9/00* (2006.01)

(52) U.S. Cl. .............................. 29/890.08; 29/888.06; 29/557; 409/163; 409/174

(58) Field of Classification Search ............ 29/890.08, 29/90.01, 888.06, 557; 138/115, 111, 116, 138/117; 409/132, 163, 164, 174, 140, 139, 409/301, 344; 60/323, 313; 269/104
See application file for complete search history.

(56) References Cited

U.S. PATENT DOCUMENTS 2,713,195 A * 7/1955 Hemmer ................ 29/890.052
3,782,847 A * 1/1974 Kulzer ....................... 408/1 R
3,954,044 A * 5/1976 Ridgway .................... 409/139
4,148,470 A * 4/1979 Kolnes et al. ............. 269/101
6,425,243 B1 * 7/2002 Chen et al. .................... 60/323
6,581,377 B2 * 6/2003 Carlson et al. ............... 60/323
6,663,095 B1 * 12/2003 Fowler ....................... 269/287

FOREIGN PATENT DOCUMENTS

DE 43 00 627 A1 * 7/1994
JP 59161241 A * 9/1984
JP 8-4527 * 1/1996

* cited by examiner

*Primary Examiner*—Marc Jimenez
(74) *Attorney, Agent, or Firm*—Taft, Stettinius & Hollister, LLP

(57) ABSTRACT

A method is provided for machining the stainless steel automotive exhaust components that allows such components to be machined in high volumes and at a reasonable cost. An exemplary embodiment of the method includes the steps of: (a) supporting the manifold on a work structure; (b) clamping the manifold to the work structure; and (c) machining the supported and clamped manifold; (d) where the clamping step includes the step of clamping each of the plurality of inlet coupling flanges of the manifold separately; and (e) the machining step includes the step of machining the interface surfaces of the inlet coupling flanges. In a more detailed embodiment, the supporting and clamping steps orient the planes of the interface surfaces of the inlet coupling flanges of the manifold perpendicular to a spindle access of the milling machine.

40 Claims, 14 Drawing Sheets

METHOD FOR MACHINING A STAINLESS STEEL EXHAUST MANIFOLD FOR A MULTI-CYLINDER COMBUSTION ENGINE

BACKGROUND

The present invention relates to a method for machining stainless steel components; and more particularly, to a method for machining a stainless steel exhaust manifold for a multi-cylinder combustion engine.

As automotive combustion engine technology increases the efficiency in which the fuel is burned by the combustion engines, the exhaust temperatures in such combustion engines is increasing with the increase in efficiency.

Prior to the mid-1970's, the automotive industry traditionally used gray iron as the casting alloy for exhaust manifolds because it was low cost and it had a fairly high degree of heat resistance. This alloy was sufficient because the exhaust temperatures seldom exceeded 650° C. In the mid-70's, changes in the federal emission standards caused the combustion parameters to become more efficient, which resulted in a rise in exhaust temperature over 100° C. This rise in exhaust temperature sparked the development of ductile (or nodular) iron where the graphite is a spherical shape rather than the usual flake shape of gray iron. With the introduction of air injection reaction (AIR) systems into the exhaust manifolds, the exhaust temperatures began rising higher than 760° C.; and, further, the internal manifold atmosphere became strongly oxidizing. In response, the silicon content of the nodular iron was increased from 2.5 percent to 4.0–6.0 percent for oxidation resistance. This increased silicon percentage also increased the temperature at which ferrite to austenite transformation occurred from 800° C. to approximately 870° C. In response, molybdenum was added to the nodular iron in quantities of up to two percent (producing Si—Mo iron) during the early 1980's to further increase temperature resistance.

In the mid to late 1990's and beyond, as the exhaust temperatures for some commercially-produced combustion engines rose above 950° C. to approximately 1,030° C., new stainless steel alloys have been developed for the manifolds that may include, for example, the following chemical composition:

| Element | Composition, Weight Percentage |
|---|---|
| Carbon | <0.6% |
| Silicon | <1.8% |
| Manganese | <1.0% |
| Chromium | 24.0 to 27.0% |
| Molybdenum | 0.50% Max. |
| Nickel | 12.0 to 15% |
| Phosphorus | 0.04% |
| Nitrogen | 0.08 to 0.40% |
| Niobium | 2.0% |
| Other Residual Elements | 0.50% Max. |
| Iron | Balance |

Such new stainless steel materials contain basic elements and chemistry that require unique methods of metal removal (machining) not experienced in the past. Such stainless steel manifolds contain basic elements that are not compatible with the standard machining practices, nor are they compatible with high volume machining. For example, such stainless steel exhaust manifolds contain relatively high percentages of chromium and nickel. Alloys with high percentages of these elements in the machining industry are considered not to be compatible with the conventional high volume machining methods. Additionally, sulfur, which was typically added to improve machinability, is no longer used due to environmental concerns (or is used in very low percentages)—further increasing the difficulty in machining such materials.

Further, because this new stainless steel composition is difficult to cast into thin sections using the traditional gravity casting methods, the manifolds casted with these new stainless steel compositions are casted using sand casting methods. The sand casting results in silica granules being impregnated into the stainless steel material. The silica is highly abrasive and decreases tool life. The sand scale may be as deep as 0.060 inches before the parent material is encountered.

SUMMARY

The present invention provides a method for machining the stainless steel automotive exhaust components that allows such components to be machined in high volumes and at a reasonable cost. The present invention provides a very precise machining process for machining the above-described stainless steel materials (and other materials/compositions that are difficult to machine) within desired scales of economy in a production environment. It is to be understood, however, that although the present invention is specifically tailored to address high-volume machining of the newer above-described stainless steel compositions, such as austenitic stainless steel, it is within the scope of the invention that certain (if not all) aspects of the present invention may be used for other machinable materials.

A first aspect of the present invention is directed to a method for machining a stainless steel exhaust manifold for a multi-cylinder combustion engine that includes the steps of: (a) supporting the manifold on a work structure; (b) clamping the manifold to the work structure; and (c) machining the supported and clamped manifold; (d) where the clamping step includes the step of clamping each of the plurality of inlet coupling flanges of the manifold separately; and (e) the machining step includes the step of machining the interface surfaces of the inlet coupling flanges. In a more detailed embodiment, the supporting and clamping steps orient the planes of the interface surfaces of the inlet coupling flanges of the manifold perpendicular to a spindle access of the milling machine.

In an alternate detailed embodiment of the first aspect of the present invention, the step of machining the interface surfaces of the inlet coupling flanges includes the steps of: (1) a rough milling step that involves milling the interface surfaces of the inlet coupling flanges with a rough milling cutter, followed by (2) a finish milling step that involves milling the interface surfaces of the inlet coupling flanges with a finish milling cutter; and, during the rough milling step (1), the clamping step clamps at least certain of the inlet coupling flanges at a first clamping pressure, and during the finish milling step (2) the clamping step clamps the inlet coupling flanges at a second clamping pressure, lower than the first clamping pressure. In a more detailed embodiment, the first clamping pressure is approximately 400 psi to approximately 600 psi and the second clamping pressure is approximately 300 psi to approximately 450 psi. In the exemplary embodiment, the first clamping pressure is approximately 500 psi and the second clamping pressure is approximately 350 psi.

In yet another alternate detailed embodiment of the first aspect of the present invention, the clamping step includes the step of advancing lower work supports against a support surface of certain of the inlet coupling flanges opposite to that of the interface surface and clamping the work supports in place. In a further detailed embodiment, the supporting step includes the step of supporting the manifold on at least three triangulated cast locaters provided on the work structure; and the clamping step further comprises the step of clamping a swing clamp against a body portion of the manifold, forcing the manifold against the three triangulated cast locaters. In yet a further detailed embodiment, at least two of the three triangulated cast locaters support a respective two of the inlet coupling flanges. In yet a further detailed embodiment, the inlet coupling flanges are arranged in a row and the respective two inlet coupling flanges supported by the cast locaters are the outermost inlet coupling flanges on opposite ends of the row. In yet a further detailed embodiment, the third of the three triangulated cast locaters provides support under the body portion of the manifold, approximate the outlet port, off-line from the row of inlet coupling flanges. In yet a further detailed embodiment, the step of clamping an inlet coupling flange includes the steps of: (1) positioning a flange work support radially against the inlet coupling flange and (2) radially pressing a clamp actuator against the inlet coupling flange at a point diametrically opposed to the flange work support. In yet a further detailed embodiment, the plurality of flange work supports for the corresponding plurality of inlet coupling flanges are arranged in a row parallel to the row of inlet coupling flanges and the plurality of clamp actuators for the corresponding plurality of inlet coupling flanges are arranged in a row parallel to the row of inlet coupling flanges. In yet a further detailed embodiment, the row of flange work supports are mounted on a pivotal support having a pivot access substantially parallel to the row of flange work supports, so that the row of flange work supports are pivotable upward and away from the manifold, thereby providing an openable and closeable, substantially compact clamping structure. Therefore, in yet a further detailed embodiment, the method further comprises the steps of: prior to the supporting step, opening the clamping structure; and subsequent to the supporting step, closing the clamping structure.

In another alternate embodiment of the first aspect of the present invention, the supporting step includes the step of supporting, with lower work supports, a support surface of at least some of the inlet coupling flanges, the support surface being opposite to that of the interface surface; and the method further comprises the step of drilling and/or tapping at least one coupling hole through each of the certain inlet coupling flanges, in through the interface surface and out through the support surface of the certain flange, where each coupling hole is drilled/tapped substantially coaxial with the respective lower work support. In a further detailed embodiment, each lower work support or cast locator coaxial with the coupling hole drilled/tapped in the drilling step include the substantially cylindrical cavity extending into the support end thereof for receiving the bit used in the drilling/tapping step.

In yet another alternate detailed embodiment of the first aspect of the present invention, the step of clamping an inlet coupling flange includes the steps of: positioning a flange work support radially against the inlet coupling flange and radially pressing a clamp actuator against the inlet coupling flange at a point diametrically opposed to the flange work support. In a further detailed embodiment, the plurality of flange work supports for the corresponding plurality of inlet coupling flanges are arranged in a row parallel to the row of inlet coupling flanges and the plurality of clamp actuators for the corresponding plurality of inlet coupling flanges are arranged in a row parallel to the row of inlet coupling flanges. In yet a further detailed embodiment, the row of flange work supports are mounted on a pivotal support having a pivot access substantially parallel to the row of flange work supports, so that the row of flange work supports are pivotable upward and away from the manifold, thereby providing an openable and closeable, substantially compact clamping structure. In yet a further detailed embodiment, the method further includes the steps of: prior to the supporting step, opening the clamping structure; and, subsequent to the supporting step, closing the clamping structure. In yet a further detailed embodiment, the method further includes a step of, after the closing step, clamping the clamping structure in place in the closed orientation. It is also within the scope of the invention that the clamp actuators may be mounted on the pivotable support as opposed to the flange work supports.

In yet another alternate detailed embodiment of the first aspect of the present invention, the milling machine may include a cast iron base and bed design with box weigh construction. In a further detailed embodiment, the milling machine includes a heavy high-torque spindle with large spindle bearings and at least a 50 taper of flange mounted milling tool adapters. The milling spindle can be used in a vertical or horizontal position. In yet a further detailed embodiment, the milling machine utilizes high volume flood coolant and through the spindle coolant during the milling step. In yet a further detailed embodiment, the coolant is an oil-based coolant.

A second aspect of the present invention is directed to a method for machining a stainless steel exhaust manifold for a multi-cylinder combustion engine that includes the steps of: (a) supporting and clamping the manifold on a first work structure such that the inlet coupling flange interface surfaces are oriented on a plane substantially perpendicular to the spindle axis of the milling machine; (b) machining the inlet coupling flange interface surfaces of the manifold supported and clamped on the first work structure; (c) drilling and/or tapping coupling holes in through the inlet coupling flange interface surface surfaces of the manifold supported and clamped on the first work structure; (d) removing the manifold from the first work structure; (e) supporting and clamping the manifold on a second work structure such that the outlet coupling flange interface surface is oriented on a plane substantially perpendicular to the spindle axis of the milling machine; and (f) machining the outlet coupling flange interface surface of the manifold supported and clamped on the second work structure; (g) where the step of supporting and clamping the manifold on the second work structure includes the steps of seating a plurality of coupling holes drilled through the inlet coupling flanges on locating bosses extending from the second work structure and clamping the outlet coupling flange. In a more detailed embodiment, the step of supporting and clamping the manifold on the second work structure further includes the steps of: positioning a plurality of flange work supports radially against a first radial side of the outlet coupling flange, and radially pressing a plurality of clamp actuators against the opposite radial side of the outlet coupling flange. In a further detailed embodiment, the step of machining the outlet coupling flange includes the step of driving a cutting tool along the outlet coupling flange interface surface in a direction from the opposite radial side of the outlet coupling flange to the first radial side of the outlet coupling flange, whereby the cutting motion is driven into the plurality of flange work supports.

It is a third aspect of the present invention to provide a method for machining a stainless steel exhaust manifold for a multi-cylinder combustion engine that includes the steps of: (a) supporting the manifold on a work structure; (b) clamping the manifold to the work structure, where the clamping step includes the step of clamping at least certain of the row of inlet coupling flanges separately; and (c) machining the interface surfaces of the inlet coupling flanges; (d) where the step of clamping at least certain of the row of inlet coupling flanges separately includes the steps of: (i) positioning at least one flange work support radially against each of the certain inlet coupling flanges, and (ii) radially pressing at least one clamp actuator against each of the certain inlet coupling flanges at a point diametrically opposed to the flange work support. In a further detailed embodiment, the plurality of flange work supports are arranged in a row corresponding to the row of inlet coupling flanges and are mounted on a pivotal support having a pivot axis substantially parallel to the row of flange work supports, so that the row of flange work supports are pivotable upward and away from the manifold, thereby providing an openable and closeable, substantially compact clamping structure; and the method further includes the steps of, prior to the supporting step, opening the clamping structure and, subsequent to the supporting step, closing the clamping structure.

In an alternate detailed embodiment of the third aspect of the present invention, the plurality of clamp actuators are arranged in a row corresponding to the row of inlet coupling flanges and are mounted on a pivotal support having a pivot axis substantially parallel to the row of clamp actuators, so that the row of clamp actuators are pivotable upward and away from the manifold, thereby providing an openable and closeable, substantially compact clamping structure; and the method further includes the steps of, prior to the supporting step, opening the clamping structure and, subsequent to the supporting step, closing the clamping structure.

It is a fourth aspect of the present invention to provide a method for machining an interface surface of a stainless steel conduit that includes the steps of: (a) clamping the coupling flange of the conduit to a work structure between a work support and a diametrically opposed clamp actuator; (b) rough milling the interface surface of the coupling flange with a rough milling cutter; and (c) after the rough milling step, finish milling the interface with a finish milling cutter; (d) where, during the rough milling step, the coupling flange is clamped between the work support and clamp actuator at a first clamping pressure, and during the finish milling step the coupling flange is clamped between the work support and the clamp actuator at a second clamping pressure that is lower than the first clamping pressure. In a further detailed embodiment, the first clamping pressure is approximately 400 psi to approximately 600 psi and the second clamping pressure is approximately 300 psi to approximately 450 psi. In an exemplary embodiment, the first clamping pressure is approximately 500 psi and the second clamping pressure is approximately 350 psi.

In an alternate detailed embodiment of the fourth aspect of the present invention, the rough milling cutter is a 6"–12" right or left hand double 45 degree +/−25 degrees negative rake pocket milling cutter that utilizes a positive chip breaker; and the rough milling cutter is operated at a cutting speed of approximately 93 RPM to approximately 193 RPM and a feed rate of approximately 662 mm/minute to approximately 862 mm/minute during the rough milling step. In a further detailed embodiment, the finish milling cutter is a 4.9"–12" 60 degree +/−25 degree negative rack pocket milling cutter that utilizes a positive chip breaker; and the finish milling cutter is operated at a cutting speed of approximately 170 RPM to approximately 270 RPM and at a feed rate of approximately 450 mm/minute to approximately 650 mm/minute during the finish milling step. In an exemplary embodiment, the rough milling cutter is operated at a cutting speed of approximately 143 RPM; the rough milling cutter is operated at a feed rate of approximately 762 mm/minute; the finish milling cutter is operated at a cutting speed of approximately 220 RPM; and the finish milling cutter is operated at a feed rate of approximately 550 mm/minute.

DETAILED DESCRIPTION

Figure 1:
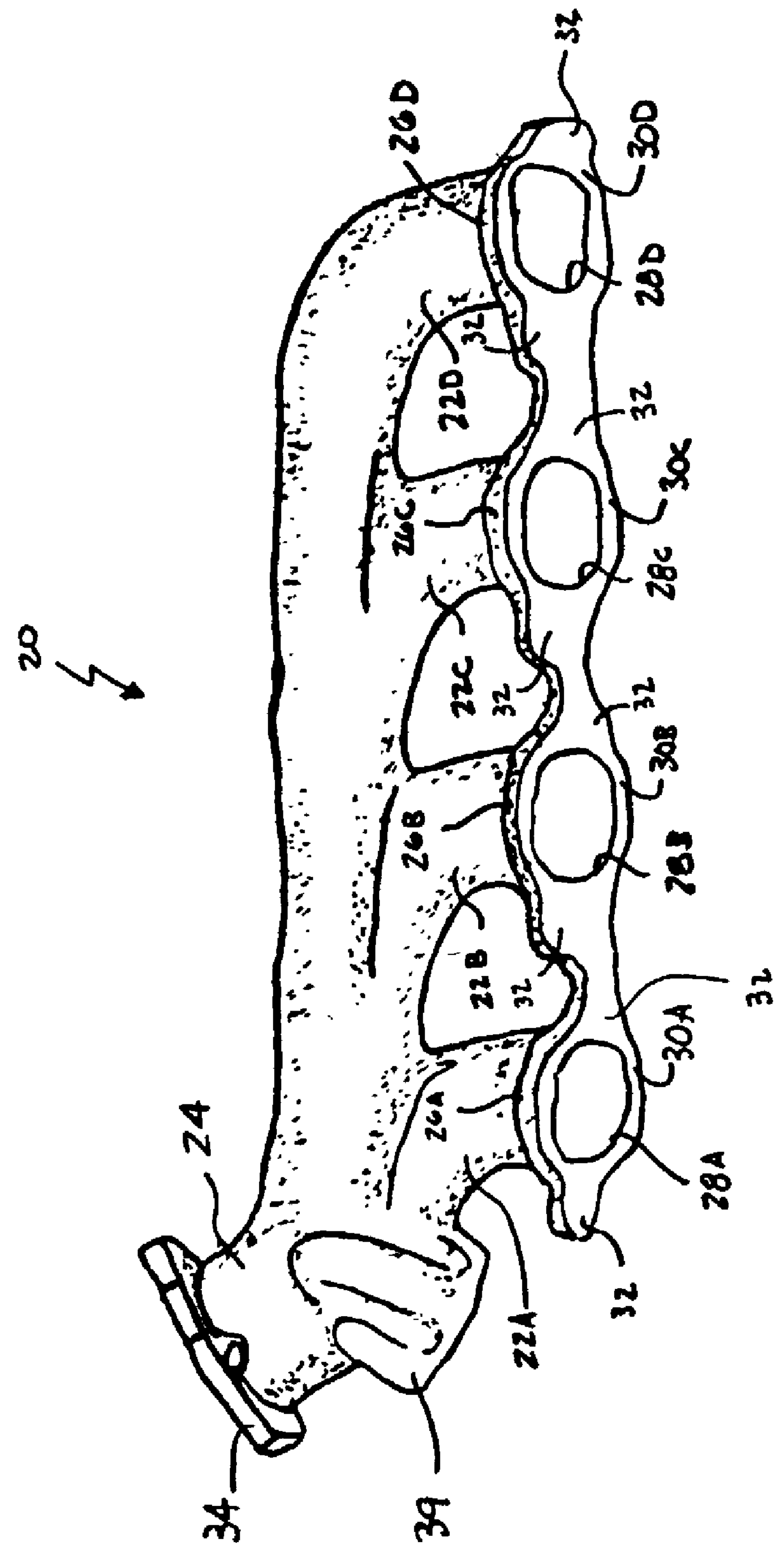
FIG. 1 is a perspective view of a raw exhaust manifold according to the present invention.

As shown in FIG. 1, an example of a raw austenitic stainless steel exhaust manifold 20 that has been molded utilizing a sand casting operation is provided. The exhaust manifold 20 shown in FIG. 1 includes a row of four inlet conduits 22A, 22B, 22C & 22D, each of which is in fluid communication with an outlet conduit 24. Each inlet conduit includes a flange 26A–26D extending radially from a mouth 28A–28D of the inlet conduit, where each flange 26A–26D includes an interface surface 30A–30D adapted to mate with and mount to the engine block of the multi-cylinder combustion engine. The flanges 26A–26D each include radial lobed portions 32 extending radially therefrom that provide areas for drilling/tapping bolt holes for use in mounting the manifold to the engine block, as will be described in further detail below. As can be seen, adjacent pairs of the radially extending lobes 32 tend to meld together between adjacent inlet conduits. The outlet conduit 24 also includes a radial flange 34 extending from its mouth 36, where the flange also includes an interface surface 38 adapted to be mated with and coupled to the exhaust assembly of the automobile (see FIG. 16 for views of the outlet mouth 36 and interface surface 38 of the flange 34). The manifold 20 illustrated in FIG. 1 also includes a projection 39 approximate the outlet conduit 24 for mounting EGR features thereto. The manifold may also include projections 102 (see FIG. 15) for coupling heat shields thereto.

The exemplary process according to the present invention will be described in a series of individual operations.

I. Pre-Machining Operations

Figure 2:
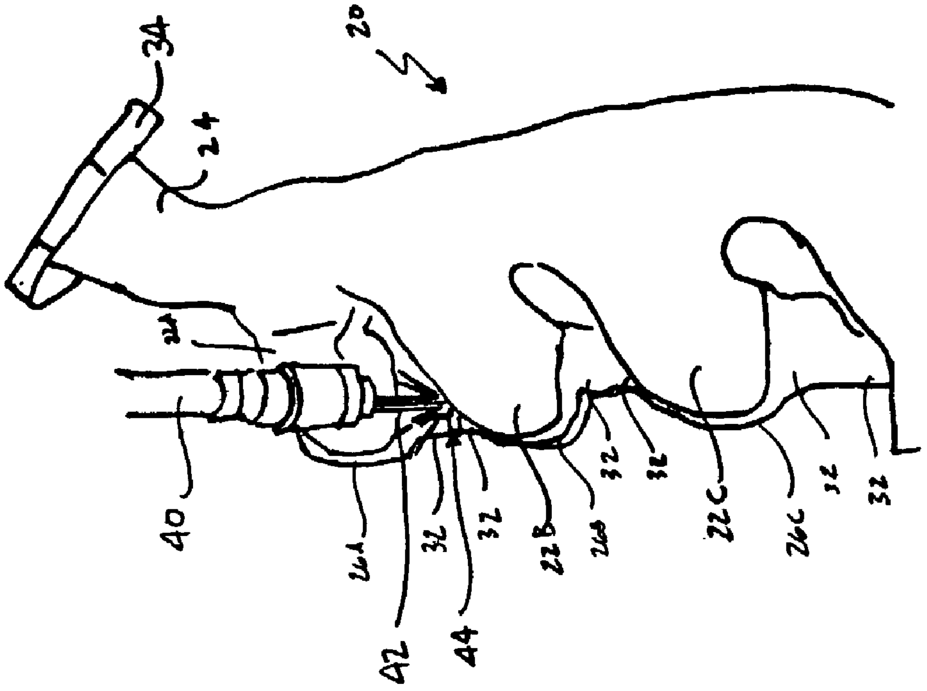
FIG. 2 is a perspective view illustrating a water jet slitting operation according to the present invention.

As shown in FIG. 2, due to the high rate of thermal expansion for the stainless steel materials of the manifold 20, it may be desirable to cut a slot between connected radial lobes 32 of adjacent inlet conduits to allow for thermal expansion and other movement between the inlet conduits during use. A water jet slitting operation is shown, where the manifold 20 is mounted to a pneumatically actuated fixture (not shown) that moves the manifold 20 with respect to a high pressure water jet nozzle 40, which emits a high pressure water jet 42 between the adjacent lobes 32 to cut a slot 44 between the adjacent lobes. In the exemplary embodiment the slot is between one and two millimeters wide; the nozzle 40 emits a jet of water and garnet at approximately 50,000 psi; the nozzle tube orifice size is 0.030"; the garnet mesh size is 80 mesh; and the feed rate of the machine is 24" per minute. A pneumatic fixture is used to hold the manifold during this operation.

II. Machining Inlet Interface Surfaces

FIGS. 3–8 illustrate an inlet interface clamping structure 46 for receiving and clamping the manifold 20 therein such that the interface surfaces 30A–30D of the corresponding input conduits 22A–22D are aligned substantially perpendicular to a spindle axis of the milling machine, so that the interface surfaces can be milled to provide an adequate surface for sealing gaskets between the interface surfaces and the cylinder head, and so that the bolt receiving holes can be drilled and tapped into the radial flanges 32.

Figure 3:
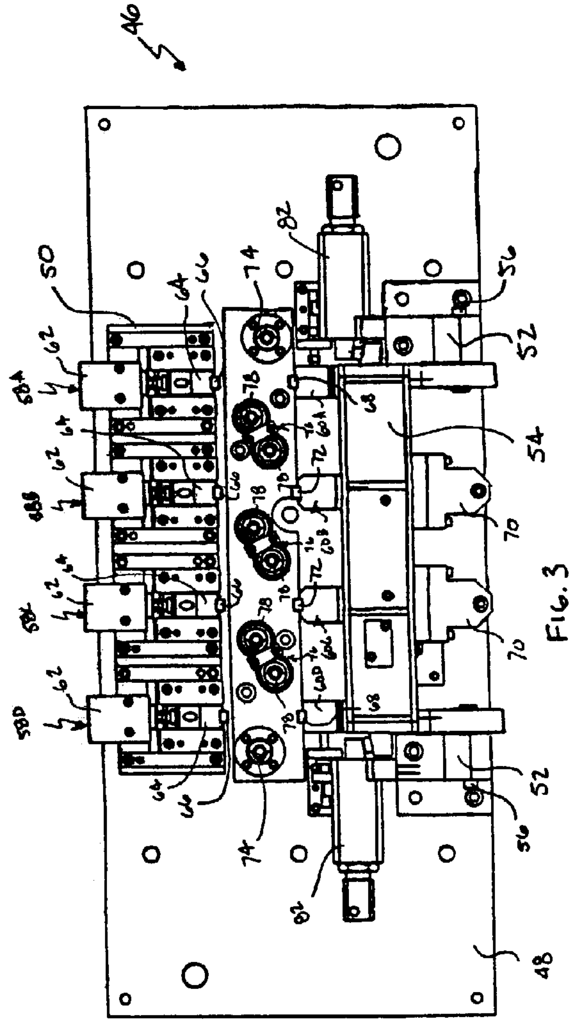
FIG. 3 is a top plan view of a clamping structure for machining the interface surfaces of the inlet flanges of the exhaust manifolds.
Figure 4:
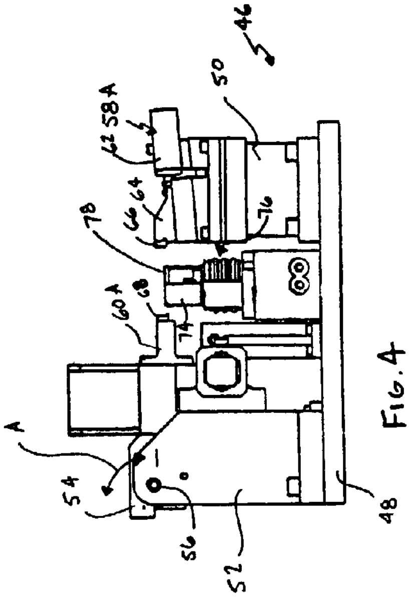
FIG. 4 is an elevational side view of the clamping structure of FIG. 3.
Figure 5:
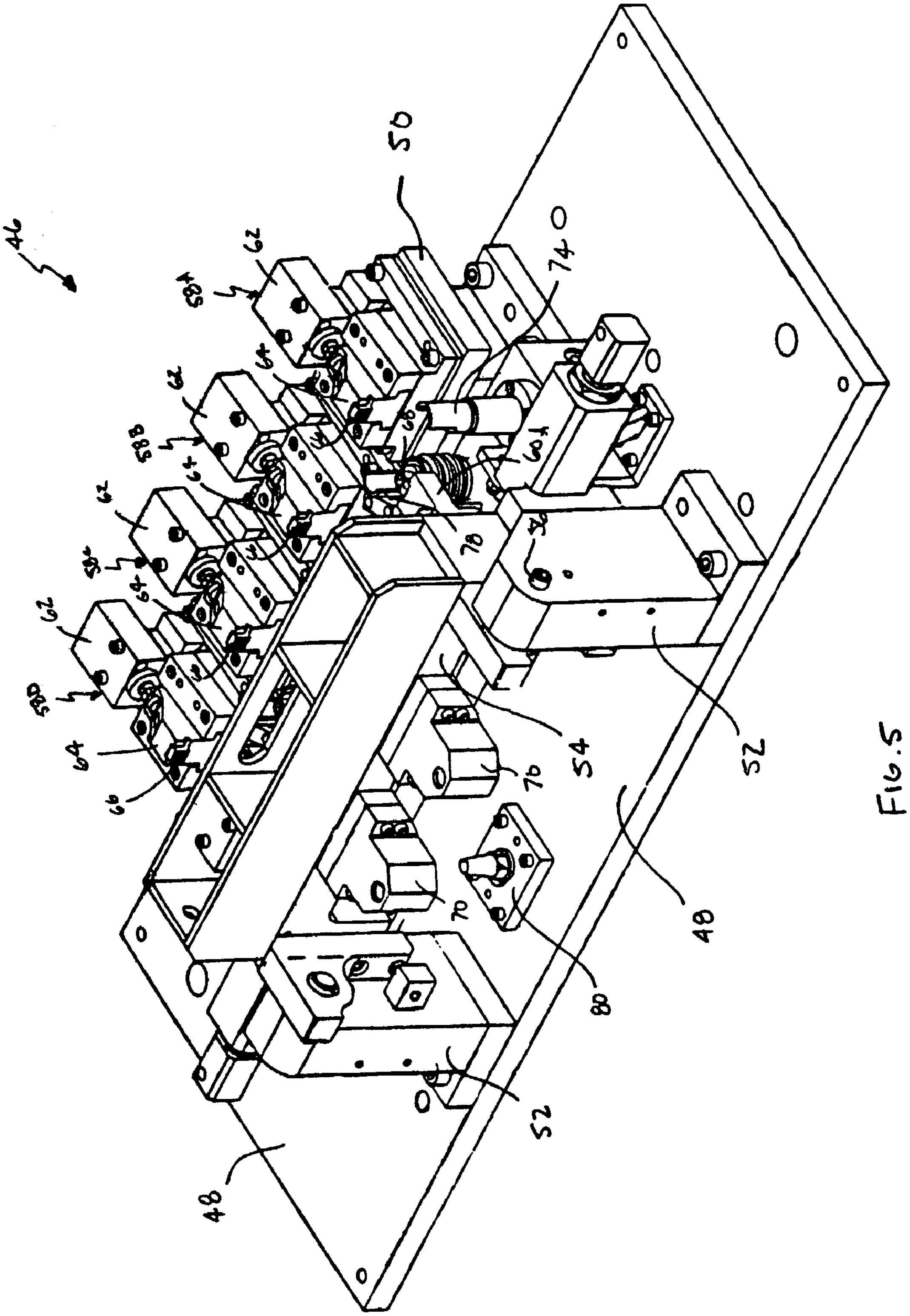
FIG. 5 is a perspective view of the clamping structure of FIGS. 3 and 4.

Referring to FIGS. 3–5, the clamping structure 46 includes a base 48 onto which is secured a longitudinal, radial clamp-support platform 50 and a pair of radial workpiece-holder bearing supports 52. A pivotal workpiece-holder mount or support 54 is pivotally mounted between the pair of bearing supports 52 to be pivotal about a pair of hinges 56 in the supports in the directions shown by arrows A. The pivot axis of the radial work support member 54 is parallel to the clamp-support platform 50 and is spaced apart from the clamp-support platform to provide an area therebetween for receiving and clamping the manifold. Mounted to the radial clamp support platform 50 are a row of radial clamp actuators 58A, 58B, 58C & 58D. Likewise, mounted to the pivotal support 54 are a row of radial work supports 60A, 60B, 60C & 60D. The row of radial clamp actuators 58A–58D and the row of radial workpiece-holders 60A–60D are substantially parallel and aligned with one another. Each radial clamp actuator 58A–58D includes a hydraulic actuator block 62, which drives a corresponding radial clamp 64 and associated gripper 66. The two outer radial workpiece-holders 60A and 60D are fixed to the pivotal support 54 and have grippers 68 that face the corresponding grippers 66 of their respective clamp actuators 58A and 58D. The two inner workpiece-holders 60B and 60C include hydraulic actuator blocks 70 operatively coupled to the respective workpiece-holders to drive the workpiece-holders 60B and 60C and their respective grippers 72 towards the corresponding grippers 66 on the corresponding clamp actuators 58B and 58C.

Positioned between and below the rows of radial clamp actuators and radial workpiece-holders are a plurality of vertical work supports for supporting each of the lobes 32 of the exhaust manifold. The vertical work supports include two outer-stationary supports 74 and a plurality of inner translating vertical support assemblies 76, each of which include two translating vertical support members 78. A rear work support 80 is provided for supporting a body portion of the manifold 20 when seated within the clamping structure 46. Collectively, the two outer vertical work supports 74 and the rear work support 80 provide three triangulated cast locators for supporting the manifold prior to clamping the manifold to the work structure utilizing the various clamp actuators, etc.

Figure 6:
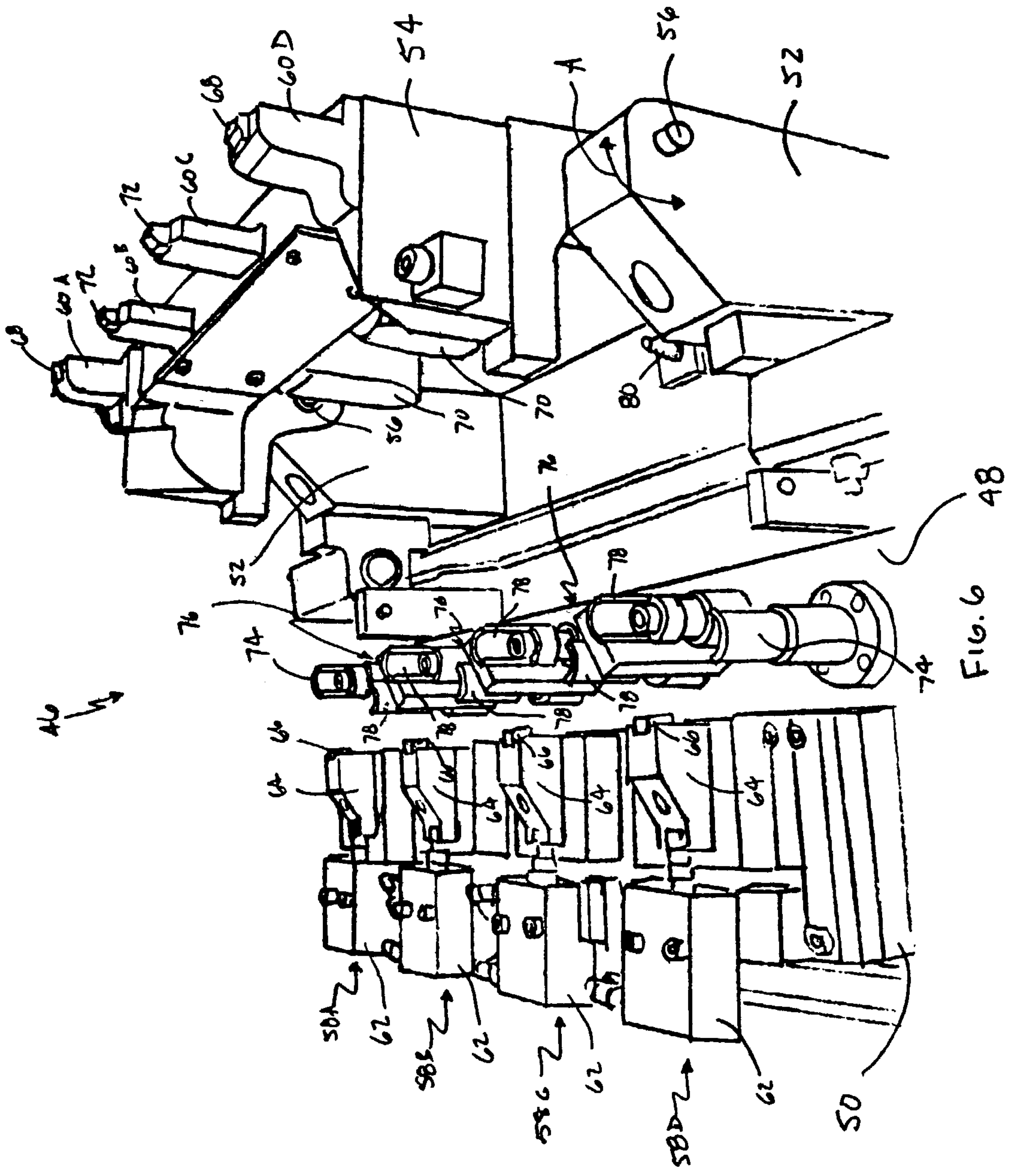
FIG. 6 is a perspective side view of the clamping structure of FIGS. 3–5, shown in an open configuration.
Figure 7:
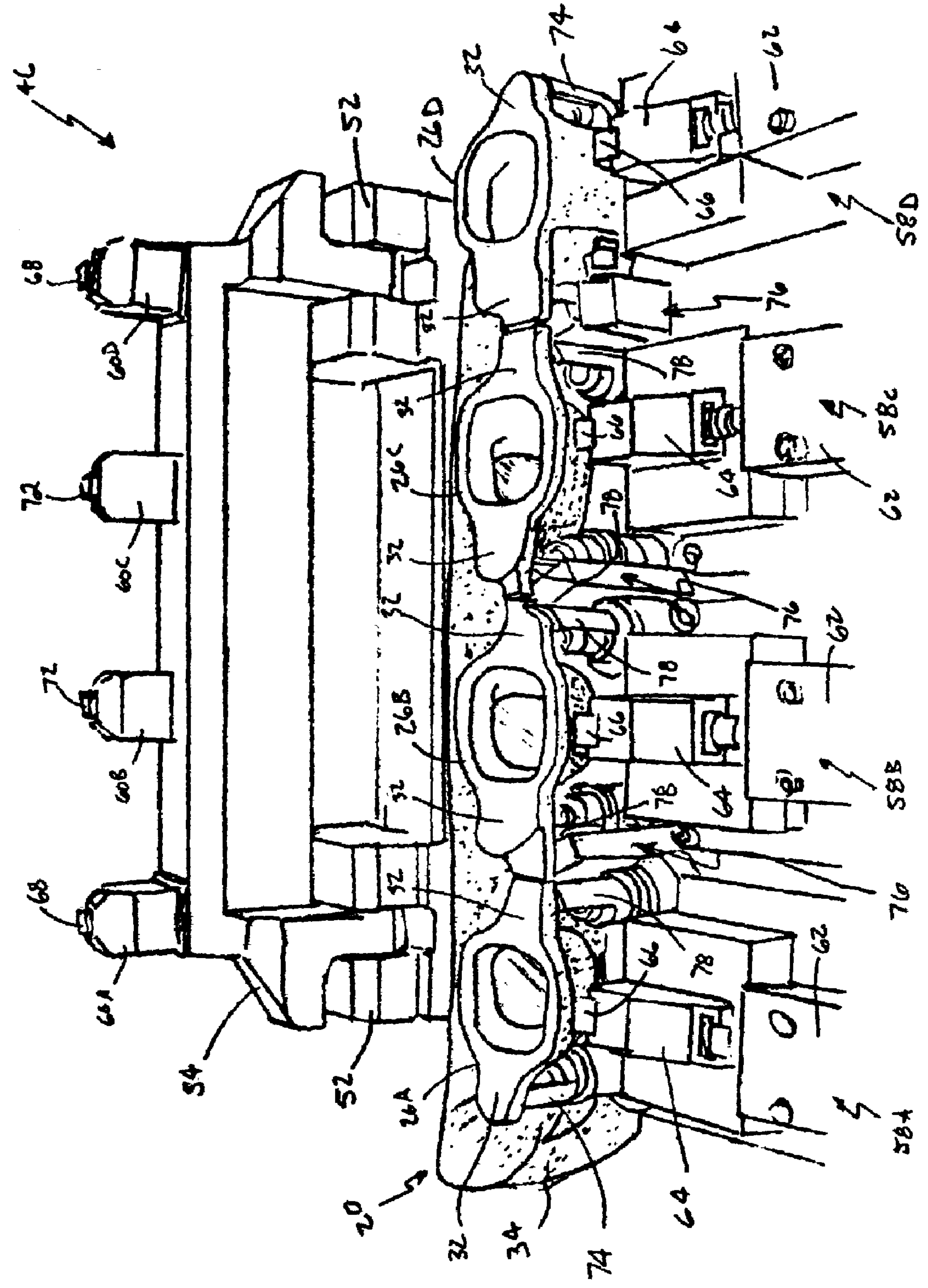
FIG. 7 illustrates a manifold being seated within the open clamping structure of FIGS. 3–6.
Figure 8:
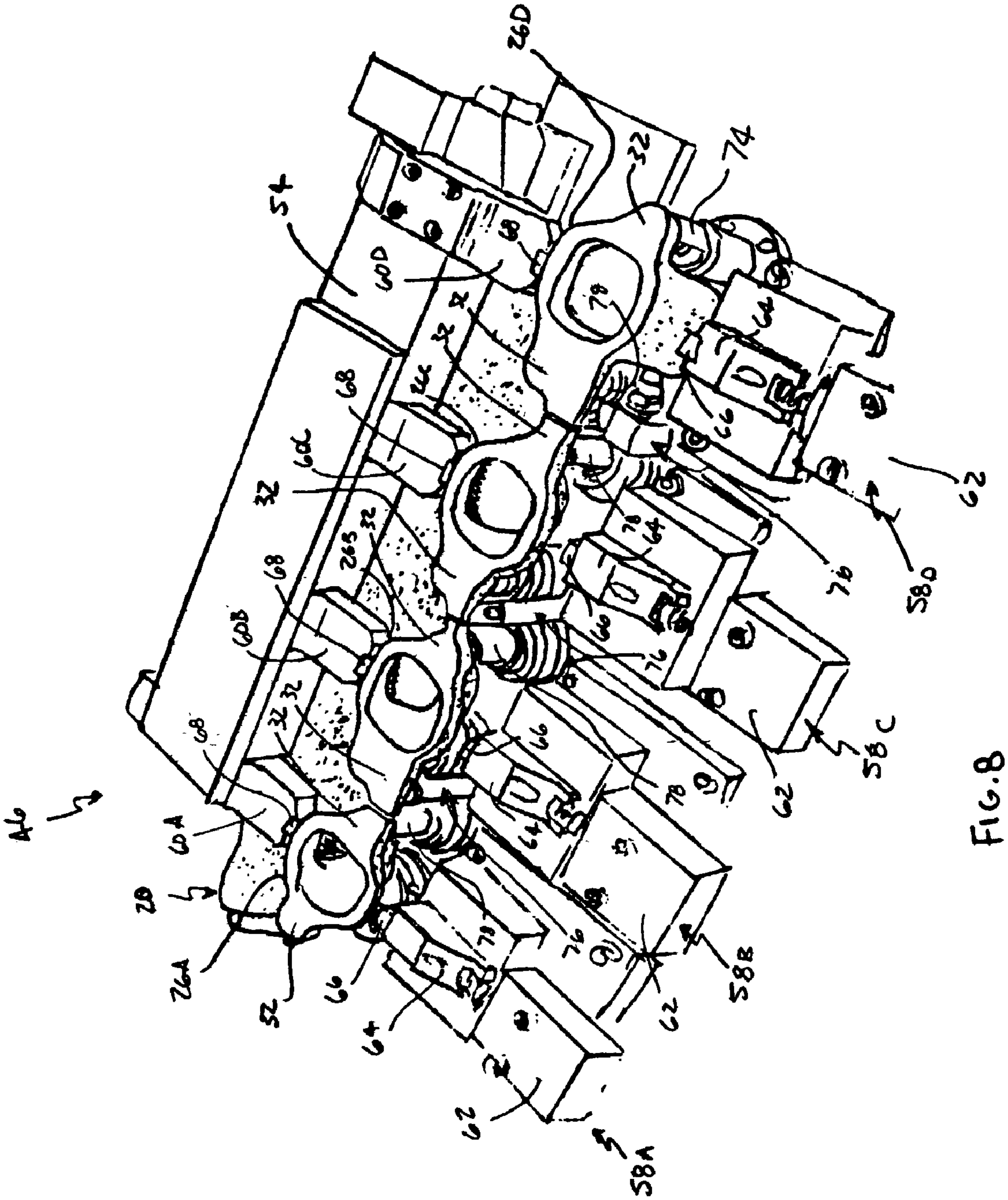
FIG. 8 illustrates the clamping structure of FIGS. 3–7 being closed upon the manifold seated therein.

The work structure shown in FIGS. 3–5 is in the "closed" position where the pivotable support 54 is pivoted downwardly such that the radial workpiece-holders 60A–60D and their associated grippers 68 face the radial clamping mechanisms 58A–58D and their associated grippers 66. FIG. 6 illustrates the clamping structure in the "open" configuration in which the pivotable support 54 is pivoted upwardly to provide a larger open area into which the manifold 20 can be seated on the three triangulated cast locators comprised by the outer vertical workpiece-holders 74 and the rear workpiece-holder 80. FIG. 7 illustrates the manifold seated within the open clamping structure as described. Once seated in such a manner, the pivotal support 54 is pivoted back again to the closed orientation as shown in FIG. 8. Referring back to FIGS. 3–5, a pair of hydraulic clamps 82 to clamp the pivotable member 54 in the closed position.

The clamping operation for clamping the manifold in place for milling after being seated within the clamping structure and after the clamping structure is closed, proceeds as follows: First, the pivotal support 54 is clamped in place in the closed position by clamps 82 at approximately 1,000 psi to approximately 1,200 psi; next, a swing clamp (not shown) is clamped on the outlet at approximately 600 to approximately 850 psi; next, the two outer radial clamp actuators 58A and 58D are forced against the respective flanges 26A and 26D of the manifold so that the flanges 26A and 26D are clamped between the hard stops 60A and 60D and the clamp actuators 58A and 58D at approximately 400 psi to approximately 500 psi; next, the vertically movable work support assemblies 76 are actuated to advance the associated vertical work support member 78 upwardly against the under side of the flanges, advancing at approximately 12 psi spring pressure to find the bottom surfaces of the flanges and are then clamped in place at approximately 3,000 psi system pressure; finally, center work supports 60B and 60C are advanced against the associated flanges 26B and 26C at approximately 12 psi spring pressure to abut the flanges, and then the center two radial clamp actuators 58B and 58C are actuated at approximately 3,000 psi to clamp the respective flanges 26B and 26C between the work support 60B, 60C and 58B, 58C. Once clamped in place in such a manner, the interface surfaces 30A–30D of the inlet flanges 26A–26D are ready to be machined.

As described above, the clamping structure 46 provides the capability to clamp each individual inlet flange 26A–26D. Because each flange 26A–26D is individually clamped as described above, the individual clamps will sufficiently dampen vibrations during the milling and cutting operations, thereby increasing the efficiency and effectiveness of the machining and cutting operations and also increasing tool life. Additionally, the clamping designs discussed above allow for clamping and supporting of the machine surfaces so that the manifold parts can be held without deforming, yet still provide enough force to allow the cutting tool to cut the surface to a required surface finish and flatness.

The milling machine, in the exemplary embodiment, utilizes a cast iron base and bed design with a boxway construction. The boxway machine utilizes turcite, which helps dissipate vibrations and, in turn, increases cutting tool life. The milling machine also includes a heavy, high torque spindle with large spindle bearings. While the exemplary embodiment utilizes a vertical spindle, it is certainly within the scope of the invention to utilize a horizontal spindle as well. The milling machine of the exemplary embodiment utilizes a minimum of 50 taper of flange-mounted milling tool adapters. Additionally, the milling machine of the exemplary embodiment utilizes coolant through the spindle with a high volume flood coolant.

Figure 9:
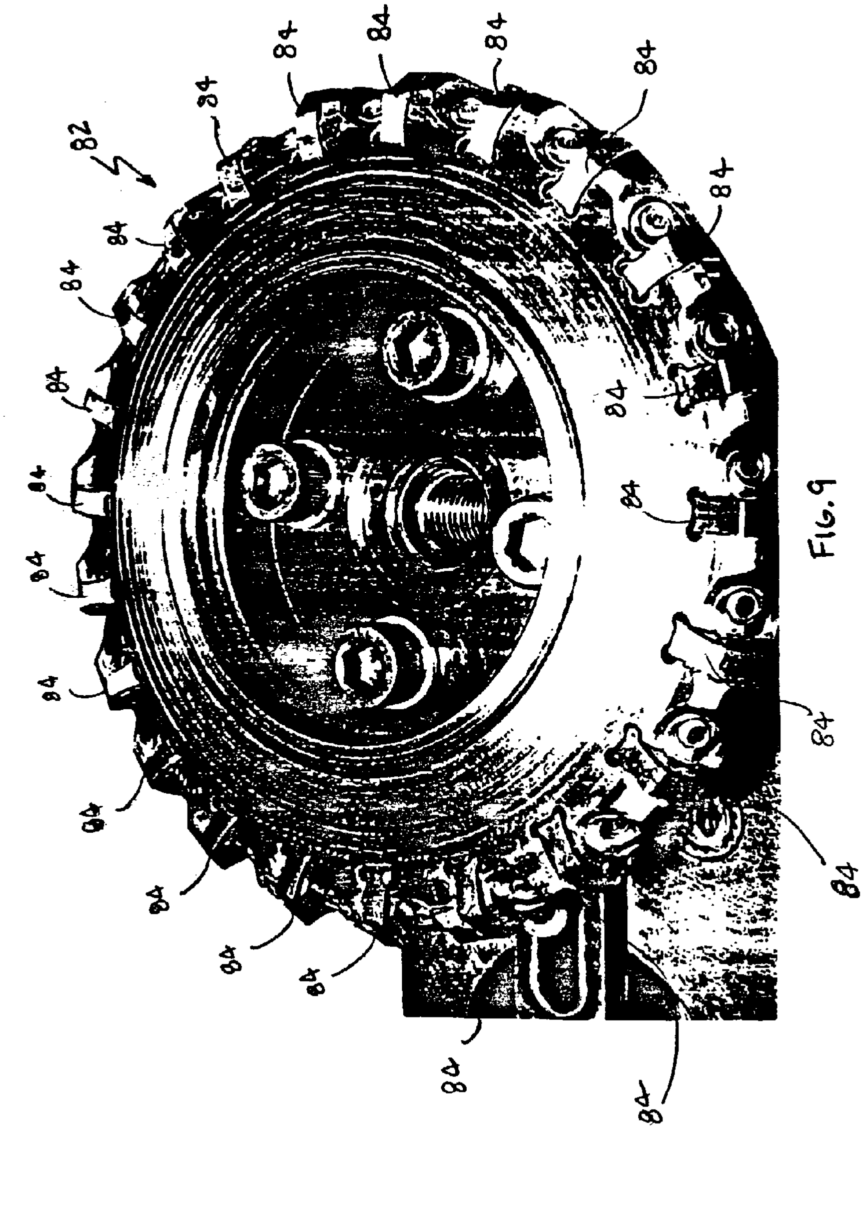
FIG. 9 is a perspective view of a rough milling tool according to the present invention.
Figure 10:
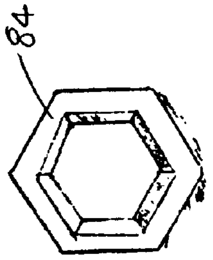
FIG. 10 illustrates a carbide insert for the rough milling tool of FIG. 9.

The machining of the interface surfaces 30A–30D of the inlet flanges 26A–26D includes a rough milling step followed by a finish milling step. As shown in FIG. 9, a rough milling cutter 82 for use with the present invention is a 6"–12" right or left-hand double 45 degree +/−25 degrees negative rock pocket milling cutter that utilizes a positive chip-breaker. Specifically, the rough milling cutter is a Valenite VRS2398510800, right- or left-hand M750, 6" milling cutter that utilizes 22 carbide inserts 84 (see FIG. 10), where the carbide inserts are Sandvik S-HNGX090516 HBR inserts (Valenite HNGX090516MR GR.307 inserts may also be used). The tool holder type in this specific embodiment is 1520010 Valenite shell mill holder.

Figure 11:
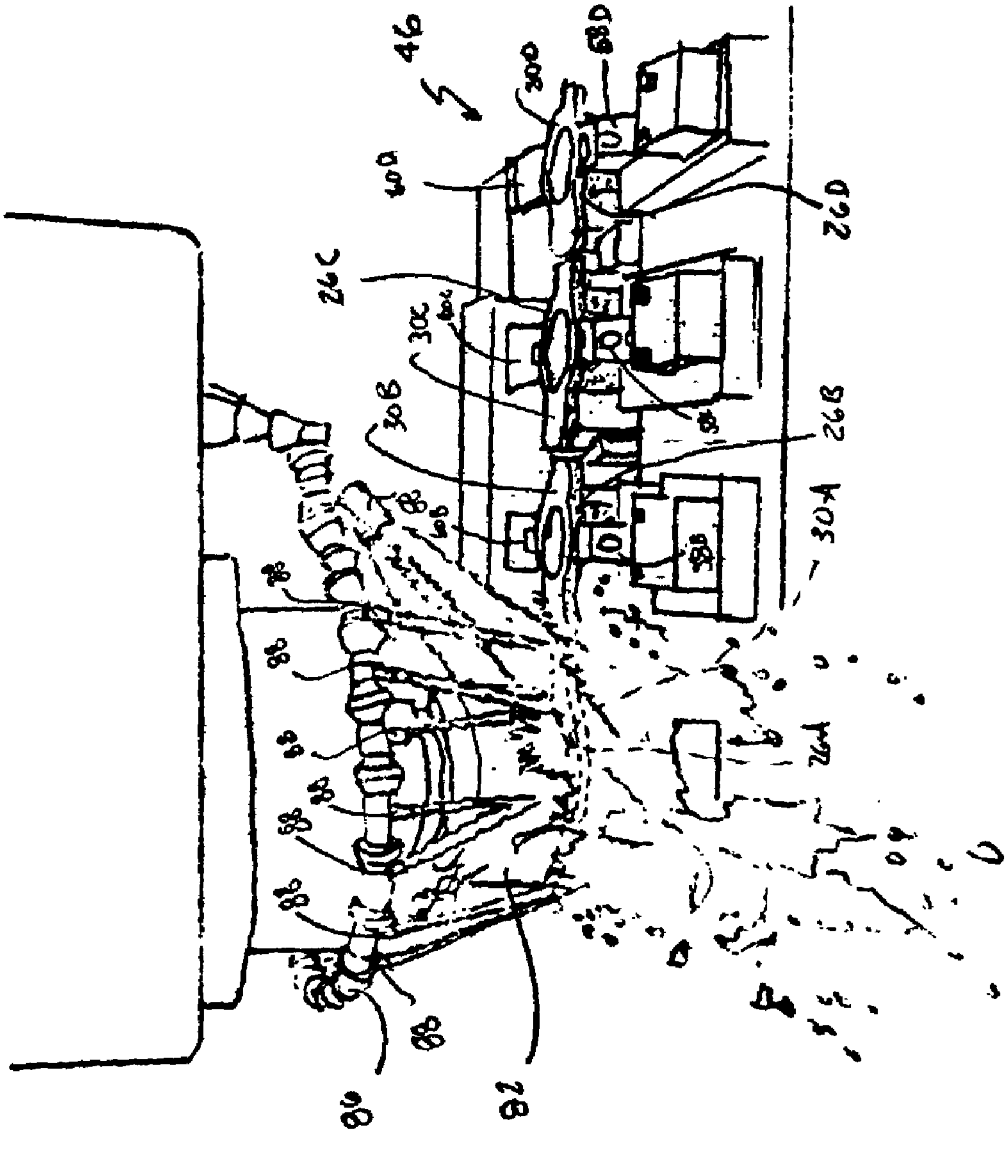
FIG. 11 is a perspective view illustrating a rough milling operation on an interface surface of the inlet flanges clamped in the clamping structure of FIGS. 3–8.

FIG. 11 illustrates the rough milling operation where the rough milling cutter 84 is being driven against the interface surface 30A of the interface flange 26A, which is, in turn, clamped to the clamping structure 46 as described above. A coolant hose 86 sprays coolant between the cutting tool 82 and the machined surfaces during the milling operation via nozzles 88. In this exemplary embodiment, the rough milling cutter is operated at a cutting speed of approximately 143 RPM and the feed rate of approximately 762 mm/minute. Also, in this exemplary embodiment, the rough milling material surface feed per minute is approximately 225. Additionally, during this rough milling operation, the radial clamp actuators 58A–58D and radial work supports 60A–60D clamp the inlet flanges 26A–26D there between at a clamping pressure of approximately 500 psi. As will be discussed below, this clamping pressure for the finish milling operation is substantially lower.

Figure 12:
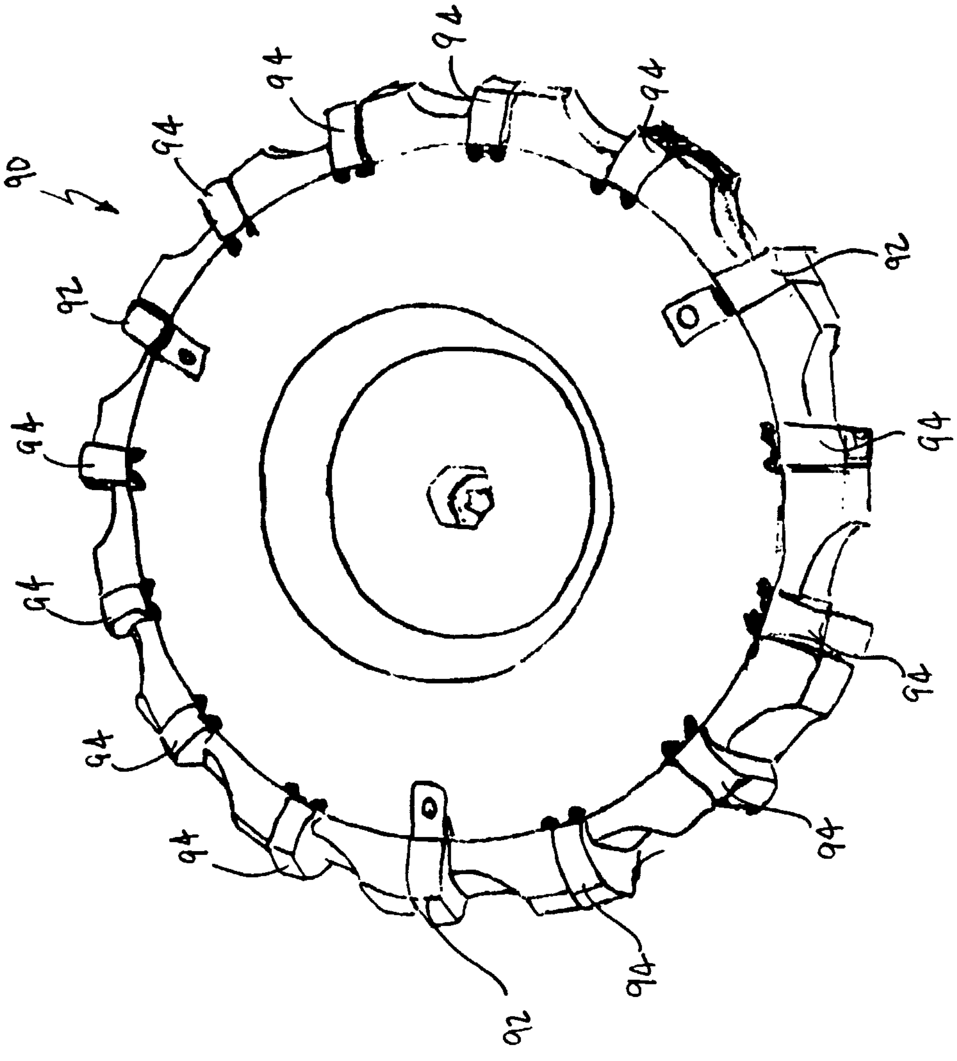
FIG. 12 is a perspective view of a finish milling tool according to the present invention.

FIG. 12 provides a finish milling tool 90 according to the exemplary embodiment of the present invention. In this exemplary embodiment, the finish milling cutter is a 4.9" 60 degree +/−25 degrees negative rack pocket milling cutter that utilizes a positive chip-breaker. Specifically, the finish milling cutter is a Valenite VFHX30HF0492K15R, M750, 4.9" finish mill with three wiper inserts 92 and twelve carbide cutting tool inserts 94. In this specific embodiment, the cutting tool inserts 94 are Sandvik S-HNGX090516 HBR carbide inserts (while Valenite HNGX090516MR GR.307 carbide inserts may also be used) and the wiper inserts are HNGF090504MF carbide inserts. Additionally, in this specific embodiment tool type is 1520010 Valenite shell mill holder. In the exemplary embodiment, the finish milling cutter is operated with respect to the interface surfaces 30A–30D at a cutting speed of approximately 220 RPM and a feed rate of approximately 550 mm/minute, with a finish milling material surface feed per minute of 346. Additionally, as introduced above, the clamping pressures of the radial clamp actuators 58A–58D and radial work supports 60A–60D are lowered, during the finish milling operation, to approximately 350 psi.

While the radial clamping pressures for the rough milling operation were described above as being approximately 500 psi in the exemplary embodiment, it is within the scope of the invention that this clamping pressure be approximately 400 psi to approximately 600 psi. Furthermore, while the radial clamping pressure for the finish milling operation was described above as being approximately 350 psi in the exemplary embodiment, it is within the scope of the present invention that this finish clamping pressure be approximately 300 psi to approximately 450 psi. Furthermore, while the rough milling operation described above operated at a cutting speed of approximately 143 RPM at a feed rate of approximately 762 mm/minute, it is within the scope of the invention that the rough milling cutter be operated at a cutting speed of approximately 93 RPM to approximately 193 RPM and the feed rate of approximately 662 mm/minute to approximately 862 mm/minute. Additionally, while the finish milling cutter was described above in the exemplary embodiment as being operated at a cutting speed of approximately 220 RPM and a feed rate of approximately 550 mm/minute, it is within the scope of the invention that the finish milling cutter be operated at a cutting speed of approximately 170 RPM to 270 RPM and a feed rate of approximately 450 mm/minute to a feed rate of approximately 650 mm/minute during the finish milling step.

Figure 13:
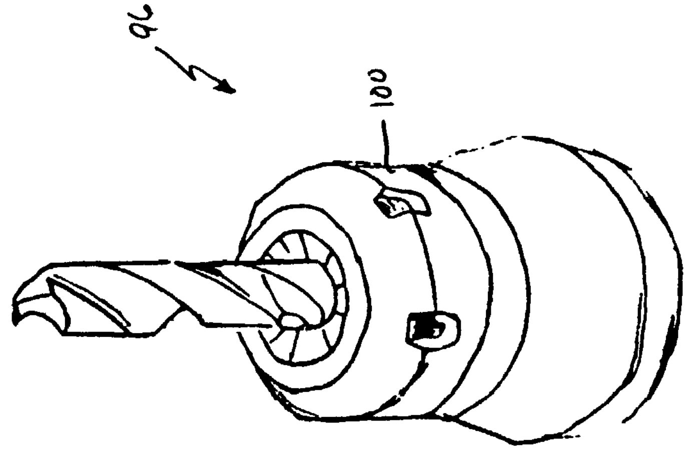
FIG. 13 is a perspective view of a coolant through drill collet and bit according to the present invention.

FIG. 13 illustrates the drilling tool 96 for drilling the bolt/screw holes 98 (see FIG. 15 for example) and the radial lobes 32 of the radial flanges 26A–26D of the manifold inlets. The drilling tool 96 is mounted within the same work-holding fixture as the rough milling cutter and finish milling cutter as described above. In the exemplary embodiment, a high precision holder 100 is utilized for this application. Precision holders are commonly used for high-speed applications; yet with the present invention, the high-speed precision holder is used in this low-speed application. During this drilling operation, it is desired that the tool tip not exceed 0.0005". In the specific exemplary embodiment, the drill type is a Sandvik, 12.0, 13.8 mm coolant-through, TiAl coated carbide drill, series no. R415.5-0850/1200/1380-30-AC1-1020; or the drill type is a precision twist drill (solid carbide drill), no. PHP41MG12.0 or PHP41M613.8. The holder type is a Regofix 4"/ER32 collet holder, ultraprecision collet. It is desired that drill depths greater than 2× the drill diameter use coolant through spindle to reduce tool breakage. In this drilling operation, the drill surface feed per minute is 95; the drill RPM is as follows: 1080-8.5 mm, 769-12.0 mm, 668-13.8 mm; and the drill feed rate is as follows: 2.3 IPM-8.5 mm, 3.6 IPM-12.0 mm, 3.3 IPM-13.8 mm.

Referring again to FIGS. 3 and 6, it can be seen that the vertical work supports 74 & 78 are semi-tubular in shape so as to provide a cavity coaxial therewith, where this cavity is adapted to be coaxial with the through-holes 98 drilled during the drilling operation described above. Accordingly, such arcuate vertical work supports provide precise and coaxial support for the lobes 32 during this drilling operation while the coaxial channels allow the drill bit to pass below the lobes without interference from the vertical work supports. In the exemplary embodiment, before the drilling operation begins, the orientation and the location of the lobes 32 is checked utilizing an electronic spindle probe. Based upon this detection of the location of the lobes 32, the location of the drilling hole is calculated.

III. Drilling and Tapping Peripheral Manifold Features

As mentioned above, exhaust manifolds 20 may have areas for additional exhaust system and emission components; for example, the exemplary embodiment provides for milling, drilling and tapping the projection 39 for the installation of the emission sensor. Other projections, such as the heat shield projections 102 (see FIGS. 16 and 17), may be provided with drilled and tapped holes or drilled holes for rivets at assembly. The drilling and tapping of small holes in such projections, in the exemplary environment, utilizes low spindle speeds. With such low spindle speeds, precision tooling is critical in drilling and tapping to keep these smaller tools from breaking and increasing tool life.

Figure 14:
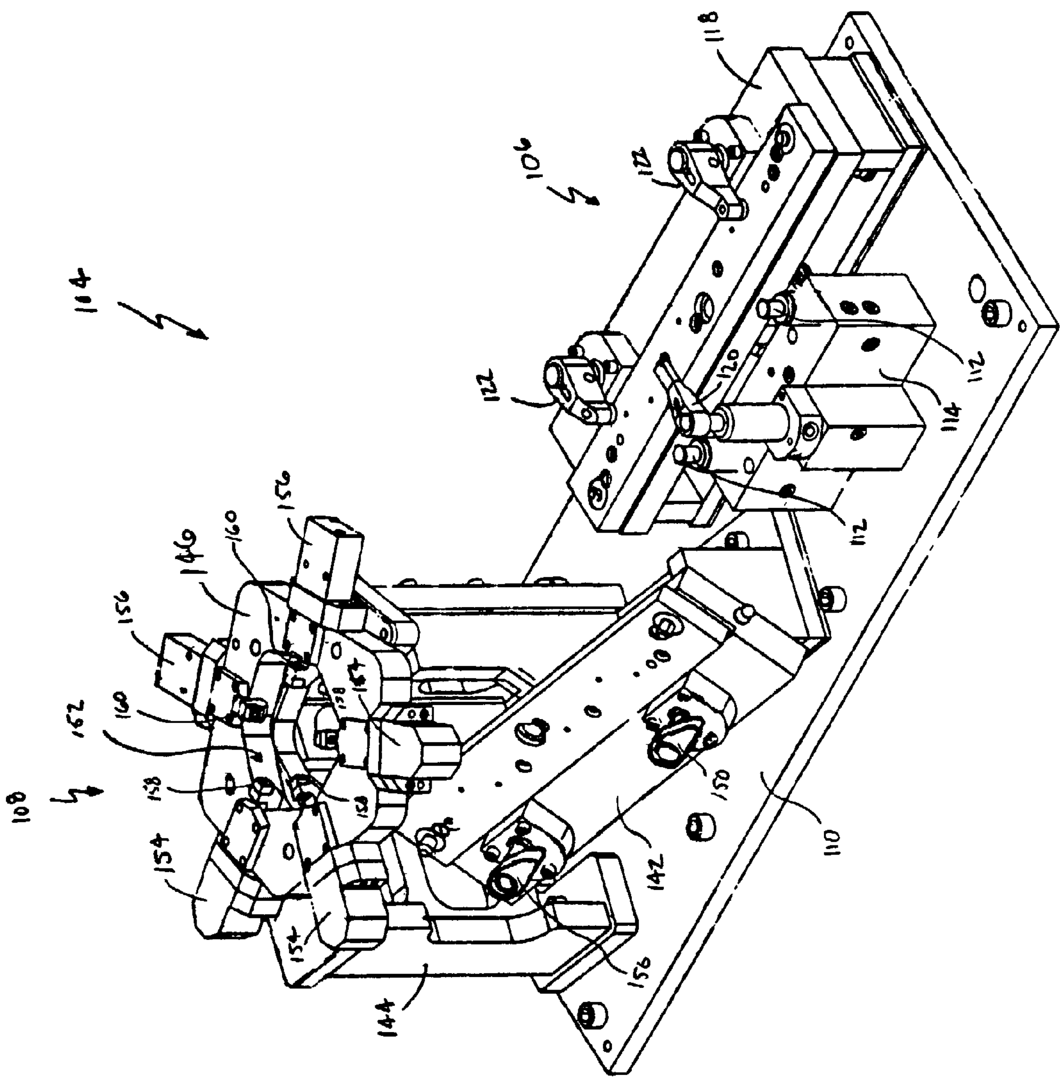
FIG. 14 is a perspective view of a clamping structure that includes a heat shield feature work-holding fixture and an outlet work-holding fixture according to the present invention.

FIG. 14 illustrates a clamping structure 104 that includes a heat shield feature work-holding fixture 106 and an outlet work-holding fixture 108, both of which are mounted to a base 110.

Figure 15:
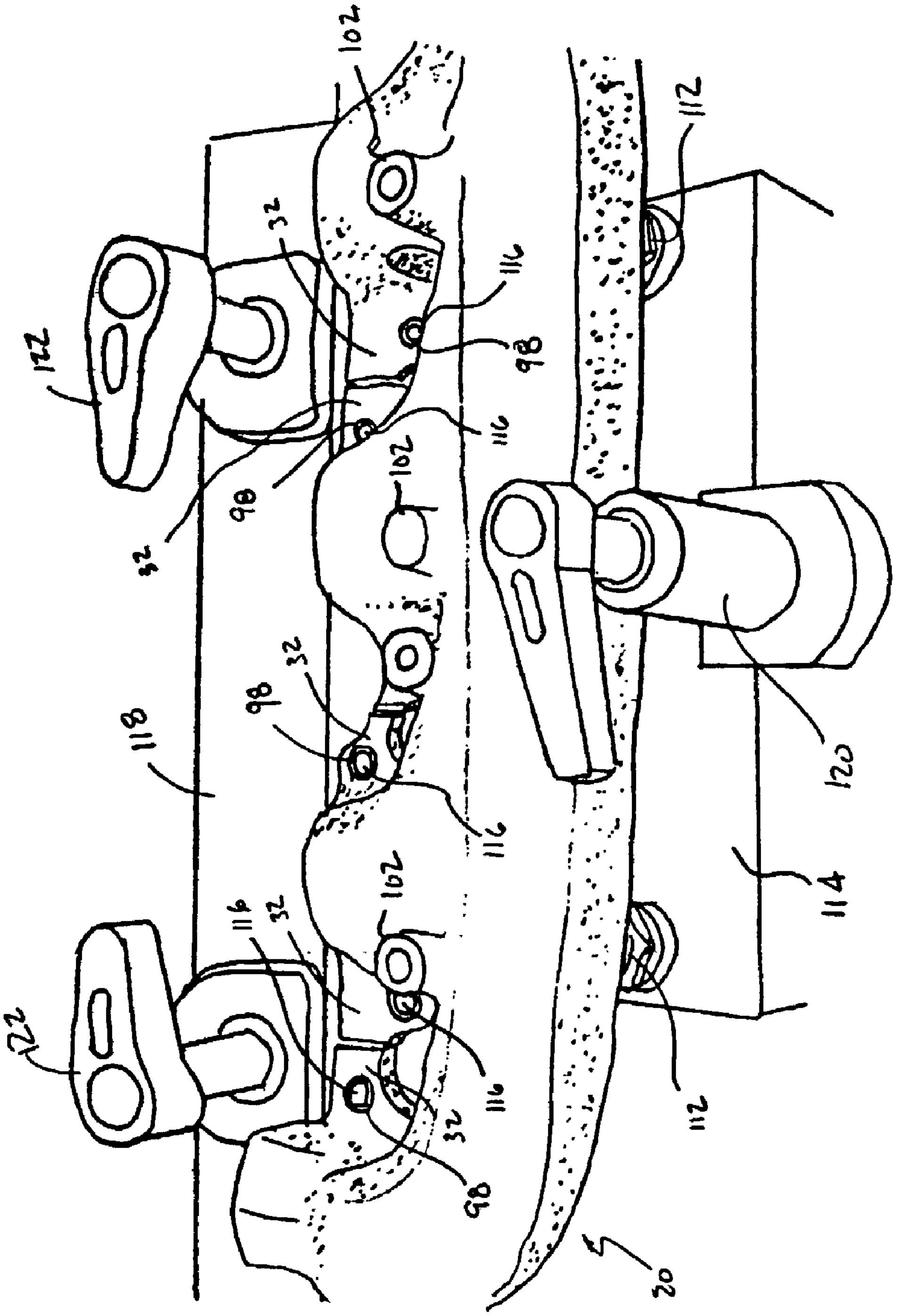
FIG. 15 is a perspective view illustrating a manifold seated in the heat shield feature work-holding fixture.

Referring to FIGS. 14 and 15, the heat shield feature work-holding fixture 106 includes a pair of manifold body support posts 112 extending from a rear platform 114 and a plurality of bosses 116 extending from a forward platform 118 that are adapted to be received within the through holes 98 drilled to the lobes 32 of the manifold inlet flanges (see FIG. 5 in particular).

The rear support 114 includes a swing clamp 120 for clamping the midsection of the manifold and the forward platform 118 includes a pair of swing clamps 122 for clamping on the inlet flanges of the manifold.

Referring to FIG. 15, the manifold 20 is mounted to the heat shield work-holding fixture 106 by mating the through holes 98 in the lobes 32 of the inlet flanges of the manifold with the bosses 116 extending from the forward platform 118 and by seating the body portion of the manifold 20 on the support posts 112. Once seated in such a manner, the swing clamps 120, 122 are activated to clamp the manifold 20 to the fixture. Once clamped, the heat shield fixtures 102 may be machined as described above.

Figure 16:
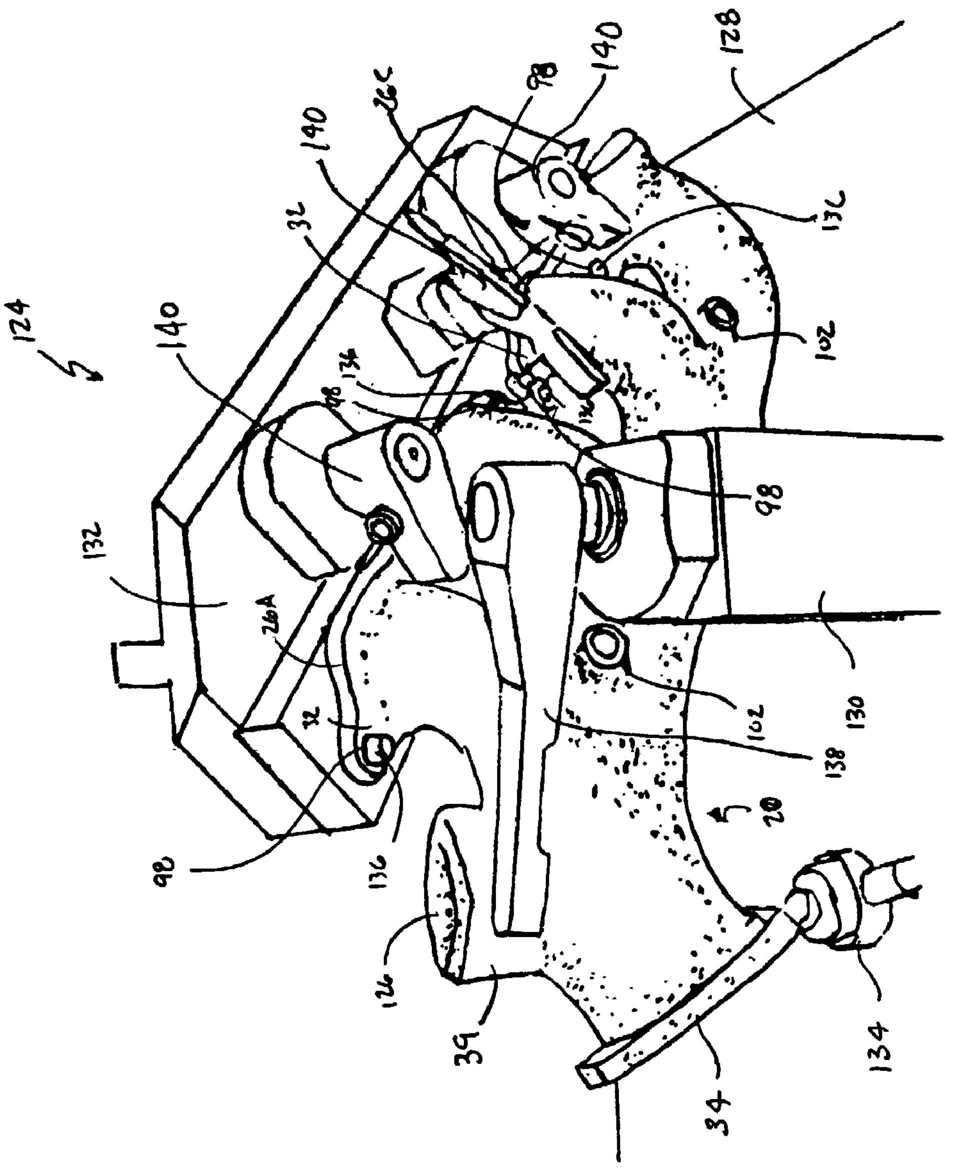
FIG. 16 is a perspective view of an EGR feature work-holding fixture seating and clamping a manifold there within.

FIG. 16 illustrates a manifold 20 mounted and clamped to an EGR feature work-holding fixture 124. This work-holding fixture 124 includes similar components to the work-holding fixture 106 described above with respect to FIGS. 14 and 15; however, the components are angled and oriented such that the planar surface 126 of the EGR feature 39 faces upwardly toward the spindle access of the milling machine. The EGR feature work-holding fixture 124 includes a base 128 onto which an elevated rear platform 130 and a downwardly and rearwardly angled, forward inlet-support platform 132 are mounted. Additionally, a support post 134 is mounted onto the base 128 for seating and supporting the outlet flange 34 of the manifold 20. The inlet-holding platform 132 includes a plurality of bosses 136 onto which the through holes 98 extending through the lobes 32 of the inlet flanges are seated. Additionally, the rear platform 130 includes a swing clamp 138 and the inlet support platform 132 includes a plurality of swing clamps 140. The manifold 20 is mounted and clamped to this work-holding fixture 124 by first mating the through holes 98 in the manifold 20 with the bosses 136 extending from the inlet support platform 132 and by seating the outlet flange 34 on the support post 134. The manifold is thereafter clamped by activating the swing clamp 138 which clamps against the outlet conduit, and the swing clamps 140, which clamp against the inlet flanges 26A–26D of the manifold 20. As shown by FIG. 16, once mounted and clamped as described, the planar outer surface 126 of the EGR feature 39 faces upwardly toward the spindle axis so that it may be machined as described herein.

The particular milling tools used for milling the heat shield features 102 and EGR feature 39 according to an exemplary embodiment of the present invention are as follows:

Heat Shield Plunge Milling Tool:
Milling tool type: Valenite S-VMSP-125R-90CCEC, plunging mill cutter
Cutting insert type: Valenite SD422P GR.307
Tool holder type: Valenite V50CT E 25L
Milling material surface feet per minute: 334
Milling cutter RPM: 1275
Milling feed rate: 89 IPM
M-10 Tap Drill:
Sandvick 6.8 mm coolant through TiAl coated carbide drill
Holder type: R415.5-0680-30-AC1-1020
Drill surface feet per minute: 87
Drill RPM: 1247
Drill feed rate: 2.36 IPM
Heat Shield Tapping Fixture:
Tap type: Reiff & Nestor MBx1.25 3 flute D-5 Tap
Holder type: Regofix 2350.13271 ER/32 Collet holder
Tap surface feet per minute: 16
Tap RPM: 200
Tap feed rate: 9.84 IPM
EGR Pad Milling Tool:
Milling tool type: Valenite 539-69-646, 3.00" diameter face mill
Cutting insert type: Valenite SDMT 1506 PDR MH 307
Tool holder type: Valenite VPBC50PC6-10 face mill holder
Milling material surface feet per minute: 236
Milling cutter RPM: 150
Milling feed rate: 18.89 IPM
MA Tap Drill:
Drill type: Sandvik 6.8 mm coolant through TiAl coated carbide drill
Holder: R 415.5-0680-30-AC1-1020
Drill surface feet per minute: 125
Drill RPM: 1412
Drill feed rate: 8.54 IPM
MA Tap Tool:
Tap type: Reiff & Nestor MBx1.25 3 flute D-5 tap
Holder type: Regofix 2350.1327 ER/32 collet holder
Tap surface feet per minute: 16
Tap RPM: 200
Tap feed rate: 9.84 IPM
EGR Feature Drill:
Drill type: 14–18 mm CJT Durapoint Special 613 drill
Holder type: Regofix 2350.13271 ER/32 collet holder
Drill surface feet per minute: 49
Drill RPM: 583
Drill feed rate: 4.29 IPM IV. Outlet Machining In the exemplary embodiment, exhaust manifold outlet machining is the final process in the machining operation on the exhaust manifold 20. Presently, outlets come in two basic configurations. In some applications, a flat surface is used with the gasket between the exhaust pipe and manifold outlet. The other feature used is an internal or external spherical radius that uses a “donut” type gasket that seals on the radius machine into the manifold.

Figure 17:
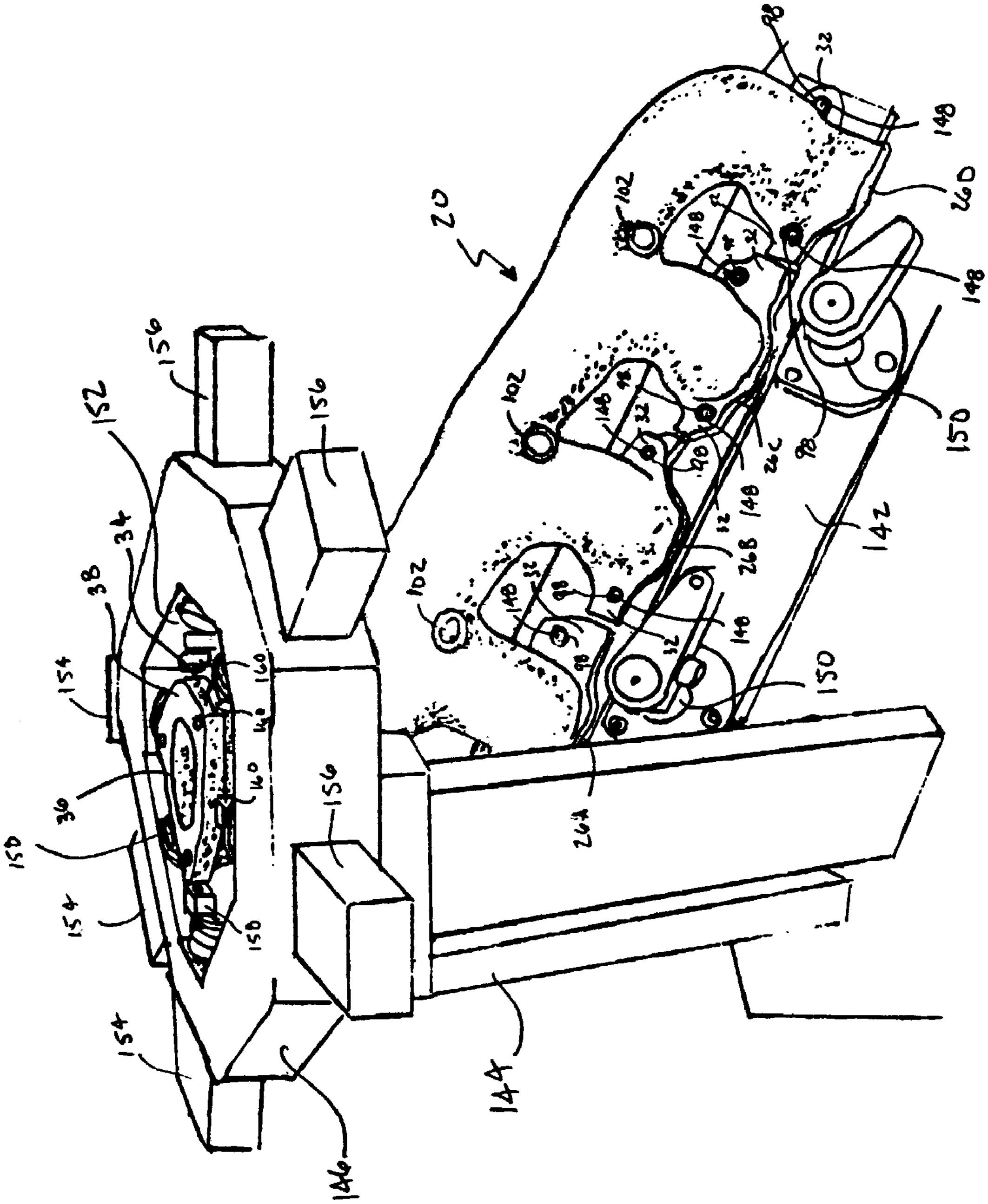
FIG. 17 is a perspective view of a manifold seated in the outlet work-holding fixture.

As shown in FIGS. 14 and 17, the outlet work-holding fixture 108 includes an inlet flange support platform 142 and an elevated outlet flange support platform 144, which supports a clamping ring 146. Referring specifically to FIG. 17, the inlet flange support platform includes a plurality of bosses 148 for seating the corresponding plurality of through-holes 98 extending through the lobes 32 of the inlet flanges 26A–26D of the manifold. The platform is angled such that, when the manifold is seated on the inlet flange support platform 142, the outlet conduit 24 extends upwardly so that the interface surface 38 of the outlet flange 34 is perpendicular to the spindle axis of the milling machine; and furthermore, so that the outlet flange 34 is positioned within the hub opening 152 of the clamping ring 146. To clamp the manifold 20 in place, the swing clamps 150 are actuated on the inlet flange support platform 142 to clamp down onto the inlet flanges 26A–26D and a plurality of clamp actuators 156 are actuated to clamp the outlet flange 34 between the clamp actuators 156 (and associated grippers 160) and the diametrically opposed work-holder supports 154 (and associated grippers 158), all of which are mounted within the clamping ring 146. Once the outlet flange 34 is clamped in such a manner, the interface surface 38 is ready for rough milling and finish milling operations as discussed above with respect to the inlet flanges, and is also ready for drilling and tapping operations as discussed with respect to the inlet flanges.

In the exemplary embodiment, the clamp actuators 154 and work-holder supports 156 are positioned along the clamping ring 146 so that, in the rough-milling and finish milling operations, the cutting tool is driven into the work-holder supports 154.

In the exemplary embodiment, the particular milling tools for milling the interface surface 38 of the outlet flange 34 are as follows:

Outlet Rough-Milling Tool

Rough-mill type: Valenite VRS2398510800, right hand M750, 6" milling cutter

Cutting Insert Type: Sandvik S-HNGX090516 HBR (or Valenite HNGX090516MR GR.307) (22) inserts per tool Tool Holder Type: 1520010 Valenite shell mill holder Rough Milling Material Surface Feet Per Minute: 225

Rough Milling Cutter RPM: 143

Rough Milling Feed Rate: 15.74 IPM

Outlet Finish Milling Tool:

Finish Mill Type: Valenite VFHX30HF0492K15R, M750, 4.9" finish mill with (3) wiper inserts Cutting tool insert type: Sandvik S-HGNX090516 HBR (or Valenite HNGX090516MR GR.307) (12) total, HNGF090504MF (3) total inserts.

Tool holder type: 1520010 Valenite shell mill holder

Finish milling material surface feet per minute: 346

Finish milling cutter RPM: 220

Finish milling feed rate: 25.35 inches per minute

M10 Tap Drill Tool:

Drill Type: Sandvik R15.5-0860-30-AC1-10208.6 mm coolant through

TiAl coated carbide drill

Holder type: Regofix 2350.13271 ER/32 collet holder

Drill surface feet per minute: 125

Drill RPM: 1412

Drill feed rate: 8.54 IPM

Outlet Borin/Spherical Radius Tool:

Tool Type: Omni design ONT-8151 Combination Radius/Boring tool

Holder type: Integral holder built as one piece from a blank

Boring Surface Feet Per Minute: 14

Boring RPM: 350

Boring Feed Rate: 2.36 IPM

NOTE: Speeds and feeds may be critical with this tool so tool chatter does not scrape the part, as these are critical sealing areas for the exhaust assembly. The above spherical boring tool is used on parts that use an internal or external radius gasket design.

Tap Tool:

Tap Type: Reiff & Nestor M10x1.50 3 flute D-6 controlled minor diameter tap

Holder type: Regofix 2350.13271 ER/32 collet holder

Tap Surface Feet Per Minute: 16

Tap RPM: 150

Tap Feed Rate: 8.85 IPM

With the exemplary embodiment of the present invention, the clamping pressures for the clamp actuators 156 are 700 psi; however, it is within the scope of the invention that the clamping pressures can range from approximately 600 psi to approximately 800 psi. Additionally, while the outlet rough milling RPM, in the exemplary embodiment, is 155 with a feed rate of 480 mm per minute, it is within the scope of the invention that the outlet rough milling tool RPM be approximately 105 to approximately 205 and that the outlet rough milling tool feed rate be approximately 380 mm per minute to approximately 580 mm per minute. Likewise, while the outlet finish tool, in the exemplary embodiment, is operated at an RPM of 220 and a feed rate of 550 mm per minute, it is within the scope of the present invention that the outlet finish tool RPM be operated at approximately 170 to approximately 270 and the feed rate be approximately 450 mm per minute to approximately 650 mm per minute. As described in the exemplary embodiment, the outlet work-holding fixture 108 is designed to hold the outlet flange 34 with enough force to prevent tool breakage as machining occurs a long distance from the top of the base 110. The fixture 108 was specifically designed to hold the manifold during heavy milling operations.

Following from the above description and invention summaries, it should be apparent to those of ordinary skill in the art that, while the apparatuses and methods herein described constitute exemplary embodiments of the present invention, it is to be understood that the inventions contained herein are not limited to these precise embodiments and that changes may be made to them without departing from the scope of the invention as defined by the claims. Additionally, it is to be understood that the invention is defined by the claims and it is not intended that any limitations or elements describing the exemplary embodiments set forth herein are to be incorporated into the meanings of the claims unless such limitations or elements are explicitly listed in the claims. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. A method for machining a stainless steel exhaust manifold for a multi-cylinder combustion engine, the exhaust manifold having a manifold body that includes a plurality of inlet tubes in fluid communication with at least one outlet, each of the inlet tubes having an inlet mouth and a coupling flange extending radially therefrom, the outlet having an outlet mouth and a coupling flange extending radially therefrom, each of the inlet coupling flanges having an interface surface adapted to mate with an engine block, and the outlet coupling flange having an interface surface adapted to mate with an exhaust assembly, the method comprising the steps of:

supporting the manifold on a work structure;

clamping the manifold to the work structure; and machining the supported and clamped manifold;

the clamping step including the step of clamping each of the plurality of inlet coupling flanges separately; and the machining step including the step of machining the interface surfaces of the inlet coupling flanges; wherein the step of machining the interface surfaces of the inlet coupling flanges includes the steps of (i) a rough milling step that involves milling the interface surfaces of the inlet coupling flanges with a rough milling cutter, followed by (ii) a finish milling step that involves milling the interface surfaces of the inlet coupling flanges with a finish milling cutter; and during the rough milling step (i) the clamping step clamps at least certain of the inlet coupling flanges of the plurality of inlet tubes at a first clamping pressure, and during the finish milling step (ii) the clamping step clamps at least certain of the inlet coupling flanges of the plurality of inlet tubes at a second clamping pressure, lower than the first clamping pressure.

2. The method of claim 1, wherein the first clamping pressure is approximately 400 psi to approximately 600 psi and the second clamping pressure is approximately 300 psi to approximately 450 psi.

3. The method of claim 2, wherein the first clamping pressure is approximately 500 psi and the second clamping pressure is approximately 350 psi.

4. The method of claim 1, wherein the clamping step includes the step of advancing lower work supports against a support surface of certain of the inlet coupling flanges opposite to that of the interface surface and clamping the work supports in place.

5. The method of claim 4, wherein the lower work supports are clamped in place at a pressure of approximately 2500 psi to approximately 3500 psi.

6. The method of claim 5, wherein the lower work supports are clamped in place at a pressure of approximately 3000 psi.

7. The method of claim 6, wherein:

the supporting step includes the step of supporting the manifold on at least three triangulated cast locators provided on the work structure; and the clamping step further comprises a step of clamping a swing clamp against a body portion of the manifold, forcing the manifold against the three triangulated cast locators.

8. The method of claim 7, wherein the swing clamp is clamped at a pressure of approximately 600 psi to approximately 850 psi.

9. The method of claim 7, wherein at least two of the three triangulated cast locators support a respective two of the inlet coupling flanges.

10. The method of claim 9, wherein inlet coupling flanges are arranged in a row and the respective two inlet coupling flanges supported by the cast locators are the outermost inlet coupling flanges on opposite ends of the row.

11. The method of claim 10, wherein the third of the three triangulated cast locators provides support under the body portion of the manifold, approximate the outlet port, off-line front the row of inlet coupling flanges.

12. The method of claim 11, wherein the step of clamping an inlet coupling flange includes the steps of:

positioning a flange work support radially against the inlet coupling flange; and radially pressing a clamp actuator against the inlet coupling flange at a point diametrically opposed to the flange work support.

13. The method of claim 12, wherein the plurality flange work supports for the corresponding plurality of inlet coupling flanges are arranged in a row parallel to the row of inlet coupling flanges and the plurality of clamp actuators for the corresponding plurality of inlet coupling flanges are arranged in a row parallel to the row of inlet coupling flanges.

14. The method of claim 13, wherein the row of flange work supports are mounted on a pivotal support having a pivot axis substantially parallel to the row of flange work supports, so that the row of flange work supports are pivotable upward and away from the manifold, thereby providing an openable and closable, substantially compact clamping structure.

15. The method of claim 14, further comprising the steps of:

prior to the supporting step, opening the clamping structure; and subsequent to the supporting step, closing the clamping structure.

16. The method of claim 15, further comprising the step of, after the closing step, clamping the clamping structure in place in the closed orientation.

17. The method of claim 16, wherein the clamping structure is clamped closed at a pressure of approximately 1000 psi to approximately 1200 psi.

18. The method of claim 9, further comprising the step of drilling at least one coupling hole through each of the inlet coupling flanges, in through the interface surface and out through the support surface of the flange, each coupling hole being drilled substantially coaxial with a respective lower work support or cast locator.

19. The method of claim 18, wherein each lower work support or cast locator coaxial with a coupling hole drilled in the drilling step includes a substantially cylindrical cavity extending into a support end thereof for receiving a drill bit used in the drilling step.

20. The method of claim 18, further comprising the step of mounting a drill bit to the spindle axis of the milling machine using a high-precision collet.

21. The method of claim 1, wherein the rough milling cutter is a 6" right or left hand double 45 degree +/−25 degrees negative rake pocket milling cutter that utilizes a positive chip breaker, and wherein the rough milling cutter is operated at a cutting speed of approximately 93 RPM to approximately 193 RMP and a feed rate of approximately 662 mm/minute to approximately 862 mm/minute during the rough milling step.

22. The method of claim 21, wherein the finish milling cutter is a 4.9" 60 degree +/−25 degrees negative rack pocket that utilizes a positive chip breaker; and wherein the finish milling cutter is operated at a cutting speed of approximately 170 RPM to approximately 270 RPM and a feed rate of approximately 450 mm/minute to approximately 650 mm/minute during the finish milling step.

23. The method of claim 22, wherein:

the rough milling cutter is operated at a cutting speed of approximately 143 RPM;

the rough milling cutter is operated at a feed rate of approximately 762 mm/minute;

the finish milling cutter is operated at a cutting speed of approximately 220 RPM; and the finish milling cutter is operated at a feed rate of approximately 550 mm/minute.

24. A method for machining a stainless steel exhaust manifold for a multi-cylinder combustion engine, the exhaust manifold having a manifold body that includes a plurality of inlet tubes in fluid communication with at least one outlet each of the inlet tubes having an inlet mouth and a coupling flange extending radially therefrom, the outlet having an outlet mouth and a coupling flange extending radially therefrom, each of the inlet coupling flanges having an interface surface adapted to mate with an engine block, and the outlet coupling flange having an interface surface adapted to mate with an exhaust assembly, the method comprising the steps of:

supporting the manifold on a work structure;

clamping the manifold to the work structure; and machining the supported and clamped manifold;

the clamping step including the step of clamping each of the plurality of inlet coupling flanges separately; and the machining step including the step of machining the interface surfaces of the inlet coupling flanges; wherein the supporting and clamping steps orient the planes of the interface surfaces of the inlet coupling flanges perpendicular to a spindle axis of a milling machine;

the supporting step includes the step of supporting, with lower work supports, a support surface of certain of the inlet coupling flanges, the support surface being opposite to that of the interface surface; and the method further comprises the step of drilling at least one coupling hole through each of the certain inlet coupling flanges, in through the interface surface and out through the support surface of the certain flange, each coupling hole being drilled substantially coaxial with a respective lower work support.

25. The method of claim 24, wherein each lower work support or cast locator coaxial with a coupling hole drilled in the drilling step includes a substantially cylindrical cavity extending into a support end thereof for receiving a drill bit used in the drilling step.

26. The method of claim 24, further comprising the step of mounting a drill bit to the spindle axis of the milling machine using a high-precision collet.

27. A method for machining a stainless steel exhaust manifold for a multi-cylinder combustion engine, the exhaust manifold having a manifold body that includes a plurality of inlet tubes in fluid communication with at least one outlet, each of the inlet tubes having an inlet mouth and a coupling flange extending radially therefrom, the outlet having an outlet mouth and a coupling flange extending radially therefrom, each of the inlet coupling flanges having an interface surface adapted to mate with an engine block, and the outlet coupling flange having an interface surface adapted to mate with an exhaust assembly, the method comprising the steps of:

supporting the manifold on a work structure;

clamping the manifold to the work structure; and machining the supported and clamped manifold;

the clamping step including the step of clamping each of the plurality of inlet coupling flanges separately; and the machining step including the step of machining the interface surfaces of the inlet coupling flanges; wherein the step of clamping an inlet coupling flange includes the steps of:

positioning a flange work support radially against the inlet coupling flange; and radially pressing a clamp actuator against the inlet coupling flange at a point diametrically opposed to the flange work support.

28. The method of claim 27, wherein the plurality flange work supports for the corresponding plurality of inlet coupling flanges are arranged in a row parallel to the row of inlet coupling flanges and the plurality of clamp actuators forte corresponding plurality of inlet coupling flanges are arranged in a row parallel to the row of inlet coupling flanges.

29. The method of claim 28, wherein the row of flange work supports are mounted on a pivotal support having a pivot axis substantially parallel to the row of flange work supports, so that the row of flange work supports are pivotable upward and away from the manifold, thereby providing an openable and closable, substantially compact clamping structure.

30. The method of claim 29, further comprising the steps of:

prior to the supporting step, opening the clamping structure; and subsequent to the supporting step, closing the clamping structure.

31. The method of claim 30, further comprising the step of, after the closing step, clamping the clamping structure in place in the closed orientation.

32. The method of claim 31, wherein the clamping structure is clamped closed at a pressure of approximately 1000 psi to approximately 1200 psi.

33. The method of claim 28, wherein row of clamp actuators are mounted on a pivotal support having a pivot axis substantially parallel to the row of clamp actuators, so that the row of clamp actuators are pivotable upward and away from the manifold, thereby providing an openable and closable, substantially compact clamping structure.

34. The method of claim 33, further comprising the steps of:

prior to the supporting step, opening the clamping structure; and subsequent to the supporting step, closing the clamping structure.

35. The method of claim 34, further comprising the step of, after the closing step, clamping the clamping structure in place in the closed orientation.

36. A method for machining a stainless steel exhaust manifold for a multi-cylinder combustion engine, the exhaust manifold having a manifold body that includes a plurality of inlet tubes in fluid communication with at least one outlet, each of the inlet tubes having an inlet mouth and a coupling flange extending radially therefrom, the outlet having an outlet mouth and a coupling flange extending radially therefrom, each of the inlet coupling flanges having an interface surface adapted to mate with an engine block, and the outlet coupling flange having an interface surface adapted to mate with an exhaust assembly, the method comprising the steps of:

supporting the manifold on a work structure;

clamping the manifold to the work structure; and machining the supported and clamped manifold;

the clamping step including the step of clamping each of the plurality of inlet coupling flanges separate; and the machining step including the step of machining the interface surfaces of the inlet coupling flanges; wherein the machining step is performed by a milling machine that includes a cast iron base and bed design with box way construction.

37. The method of claim 36, wherein the milling machine includes a heavy high-torque spindle with large spindle bearings and at least a 50 taper of flange mounted milling tool adaptors.

38. The method of claim 37, wherein the milling machine utilizes high volume flood coolant through the spindle during the milling step.

39. The method of claim 38, wherein the coolant is an oil base coolant.

40. A method for machining a stainless steel exhaust manifold for a multi-cylinder combustion engine, the exhaust manifold having a manifold body that includes a plurality of inlet tubes in fluid communication with at least one outlet, each of the inlet tubes having an inlet mouth and a coupling flange extending radially therefrom, the outlet having an outlet mouth and a coupling flange extending radially therefrom, each of the inlet coupling flanges having an interface surface adapted to mate with the engine block, and the outlet coupling flange having an interface surface adapted to mate with the exhaust assembly, the method comprising the steps of:

supporting the manifold on a work structure;

clamping the manifold to the work structure; and machining the supported and clamped manifold;

the clamping step including the step of clamping each of the plurality of inlet coupling flanges separately via actuated mechanical clamps; and the machining step including the step of machining the interface surfaces of the inlet coupling flanges.

* * * * *